United States Patent [19]
Cok

[11] Patent Number: 5,040,064
[45] Date of Patent: Aug. 13, 1991

[54] METHOD OF PROCESSING SAMPLED SIGNAL VALVES PRODUCED BY A COLOR IMAGING DEVICE

[75] Inventor: David R. Cok, Rochester, N.Y.
[73] Assignee: Eastman Kodak Company, Rochester, N.Y.
[21] Appl. No.: 415,942
[22] Filed: Oct. 2, 1989
[51] Int. Cl.⁵ .............................................. H04N 5/14
[52] U.S. Cl. ...................................... 358/163; 358/44
[58] Field of Search ...................... 358/41, 43, 44, 163, 358/213.15, 213.17, 428

[56] References Cited

U.S. PATENT DOCUMENTS 4,630,307 12/1986 Cok ........................................ 358/44
4,642,678 2/1987 Cok ........................................ 358/44
4,764,805 8/1988 Rabbani et al. .................... 358/13 C

OTHER PUBLICATIONS

R. Nevatia, Image Segmentation, Handbook of Pattern Recognition and Image Processing, 1986, pp. 215–231.

Primary Examiner—Howard W. Britton
Assistant Examiner—Kim Yen Vu
Attorney, Agent, or Firm—Edward Dugas

[57] ABSTRACT

Blurring along edges between regions of different color characteristics in interpolated color images is avoided by a signal processing technique that segments the fully sampled channel into a plurality of contiguous image regions of respectively different image characteristics. The segmentation mechanism is such that, within a respective region, the fully sampled signal values are associated with a common image characteristic. A boundary between adjacent regions occurs where the segmentation mechanism has inferred the presence of an edge between sub-sampled locations and has assigned signal values for successive sampling locations of the fully sampled channel on opposite sides of the edge in accordance with different image characteristics. After the image has been segmented, within each region, signal values for non-sampled locations of a sub-sampled channel are interpolated in accordance with a predetermined relationship between fully sampled and sub-sampled signal values at a sampling location in that region whereat each of fully sampled and sub-sampled signal values have been produced. In addition, more than one segmentation mechanism may be employed. In this case, the image processing performance of each segmentation scheme is weighted. Interpolation values based upon each segmentation scheme are then combined as a weighted average.

12 Claims, 3 Drawing Sheets

METHOD OF PROCESSING SAMPLED SIGNAL VALVES PRODUCED BY A COLOR IMAGING DEVICE

FIELD OF THE INVENTION

The present invention relates in general to color imagery signal processing and is particularly directed to a segmentation mechanism for interpolating color band signal values so as to substantially reduce color fringing in the neighborhood of a color edge.

BACKGROUND OF THE INVENTION

Multi-channel (e.g. three color band, luminance band) imagery sensing devices, such as a digital RGB video camera, typically produce output signals whose sampling frequencies differ, with one channel (usually one of the green or the luminance channel) being fully sampled, while the other channels (the red and blue channels) carry lower resolution data. For example, in a miniaturized charge-coupled device camera, the amount of green information may be two or three times that of the red or blue channels. Moreover, in color image compression telecommunication systems, it is common practice to subsample the chrominance channels prior to applying the data to a compression mechanism, for the purpose of further reducing the amount of data to be transmitted.

Because of this reduction in the amount of information through which the original image has been defined, upon reconstruction, it is necessary to fill in or interpolate values for non-sampled image locations of the lower resolution channel. A widespread technique for carrying out the interpolation process is to conduct a one or two-dimensional linear interpolation for computing values of image locations, where there is no chrominance information, from adjacent pixels where chrominance values are available. Typically, the interpolated value is a color difference signal, such as an I, Q, R-G, or B-G signal. Unfortunately, such linear interpolation process yields color artifacts (a blurring or smearing of the image) at edges between regions of different color, so that the colored component of the edge is not as sharp as the luminance component, thereby reducing the quality of both photographic images and video images of real scenes.

SUMMARY OF THE INVENTION

In accordance with the present invention, the above-described color fringing of edges between regions of different color in images that are processed by conventional interpolation mechanisms is effectively avoided by means of a new and improved signal processing technique that subdivides the fully sampled channel into a segmentation diagram comprised of a plurality of contiguous image regions of respectively different image characteristics. The segmentation mechanism is such that, within a respective region, the fully sampled signal values are associated with a common image characteristic. A boundary between adjacent regions occurs where the segmentation mechanism has inferred the presence of an edge between sub-sampled locations and has assigned signal values for successive sampling locations of the fully sampled channel on opposite sides of the edge in accordance with different image characteristics. After the image has been segmented, within each region, signal values for non-sampled locations of a sub-sampled channel are interpolated in accordance with a predetermined relationship between fully sampled and sub-sampled signal values at a sampling location in that region whereat each of the fully sampled and sub-sampled signal values have been produced.

The interpolation process according to the present invention may be carried out using more than one segmentation mechanism. In this instance, the image processing performance of each segmentation scheme is weighted. Interpolation values based upon each segmentation scheme are then combined as a weighted average.

DETAILED DESCRIPTION

Figure 1:
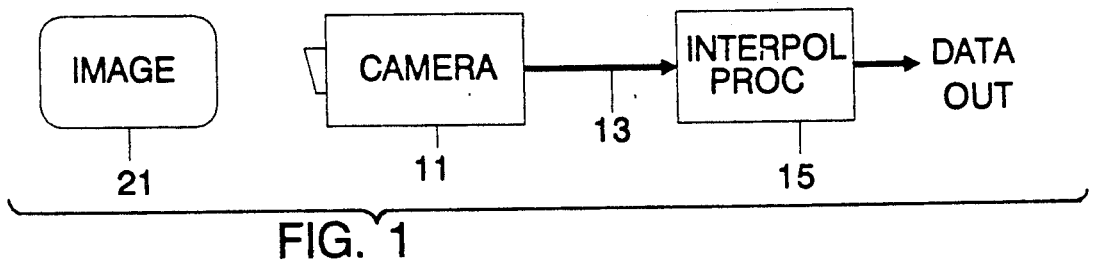
FIG. 1 diagrammatically shows a color image processing system employing a dedicated color sample interpolation processor.

Before describing the details of an embodiment of the present invention, it should be observed that the invention resides primarily in a novel color imagery signal interpolation method, rather than a particular implementation of that method. Moreover, although, in its preferred embodiment, the invention is implemented using a programmed digital computer, the interpolation method may be carried out by means of a variety of structural combinations of conventional signal processing circuits and components, such as custom-configured integrated circuit hardware. Accordingly, the structure, control and arrangement of the signal processing hardware of an embodiment of the invention have been illustrated in the drawings by a readily understandable block diagram, which shows only those specific details that are pertinent to the present invention, so as not to obscure the disclosure with structural details which will be readily apparent to those skilled in the art having the benefit of the present description.

Referring now to FIG. 1, a color image processing system is diagrammatically shown as comprising a color image transducer device, such as a digital RGB video camera 11, that supplies over its output link 13 image characteristic-representative digital signals, such as respective red, green and blue channel signal values representative of the red, green and blue color band components of a color image 21, light from which is incident upon an opto-electronic conversion matrix within the camera. As noted previously, when image 21 is scanned by camera 11, the sampling frequency is not the same for each of the respective image information bands. Typically, green is fully sampled, while red and blue are sampled at a lower frequency. As a consequence, the sampled values on link 13 are coupled to an interpolation processor 15 (e.g. a microprocessor programmed to execute the interpolation procedure set forth in detail below), which derives values for those portions (pixel locations) of an image that lie between fully sampled pixels. In the present description, those pixels that are fully sampled will be denoted by the reference character L, while the subsampled components will be denoted by the reference character C.

Figure 2:
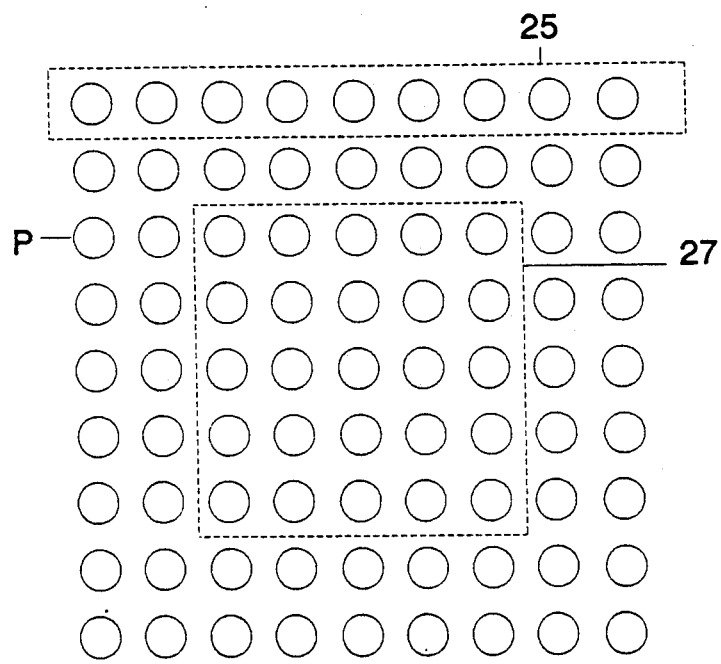
FIG. 2 diagrammatically illustrates a portion of a two-dimensional pixel array.

FIG. 2 diagrammatically illustrates a portion of a two-dimensional array of image pixels $P_{i,j}$, for which image characteristic representative signals, associated with respective image attributes, such as a specified chrominance or chrominance difference value, a luminance value, etc. are provided by camera 11. In addition, within the array a one-dimensional or linear pixel region 25 and a two-dimensional region 27 have been demarcated by broken lines and will be referenced below in the description of examples for segmenting the image into contiguous regions of differing color characteristics.

As pointed out above, in accordance with the present invention, the problem of color fringing of edges between portions of an image having differing color characteristics is effectively avoided by first segmenting the image into a plurality of contiguous image regions, between which edges are inferred and then interpolating sub-sampled signal values within each region in accordance with a predetermined relationship between fully sampled and sub-sampled signal values at sampling locations whereat fully sampled and sub-sampled signal values have been supplied by camera 11. It should be observed that the mechanism chosen to segment the image may be any of a number of conventional imagery signal processing techniques, including both one and two-dimensional segmentation schemes and the invention is not limited to any specific method. Consequently, the segmentation examples given below are merely for purposes of illustration. Other procedures described in the literature are equally applicable to the invention.

One example of a technique for segmenting the image on a one-dimensional basis involves the analysis of successive linear groups or lines of pixels, such as linear portion 25 of the array of FIG. 2, using sub-intervals delineated by those pixel locations at which sub-signal values for a sub-sampled channel have been produced by camera 11. Within each sub-interval a color edge is presumed and the analysis proceeds to determine the most likely position of the edge based upon an iterative processing of the fully sampled channel signals for all of the pixels within the sub-interval.

Figure 3:
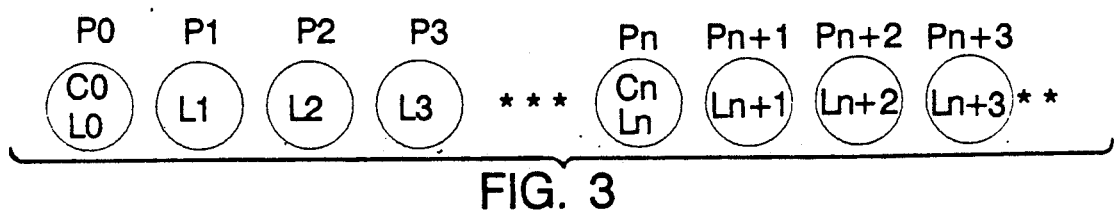
FIG. 3 diagrammatically illustrates a portion of one row of the pixel array of FIG. 2 and the differential sampling of the pixel locations within the row to produce sampled signal values $L_i$ and $C_i$.

More particularly, referring to FIG. 3, which diagrammatically illustrates a portion 25 of one row of the pixel array of FIG. 2, differential (frequency) sampling of the pixel locations $P_i$ within the row produces fully sampled signal values $L_i$ for each pixel $P_i$ and sub-sampled signal values $C_0, C_n, C_{2n}, \ldots$ for every nth pixel location, where the sub-sample factor n typically has a value of 2, 4 or 8. It is necessary, therefore, to interpolate C values for pixel locations $C_1, C_2, C_3, \ldots, C_{n-1}, C_{n+1}$, etc. In accordance with the present invention, prior to interpolating C values for these locations, within each sub-interval, such as the sub-interval between pixel locations $P_0$ and $P_n$, a color edge is inferred, and the characteristics of the image on opposite sides of the edge are presumed to conform to respectively different color characteristics, such as respectively different constant color levels or respective uniform variations in color, so that between the edge and the end points of the sub-interval, there are two color regions that are contiguous with one another at the edge. In order to determine between which two pixels the edge should be located, the segmentation process is carried out on an iterative basis, producing a series of measurements of the 'fit' of each segmented sub-interval iteration. That segmented sub-interval iteration which best fits or matches the L values of the fully sampled channel is selected. The best fit may be determined using conventional error measurement techniques, such as a least squares fit or a maximum likelihood, or Bayesion statistical procedure, or a threshold crossing of the L values between the regions.

Figure 4:
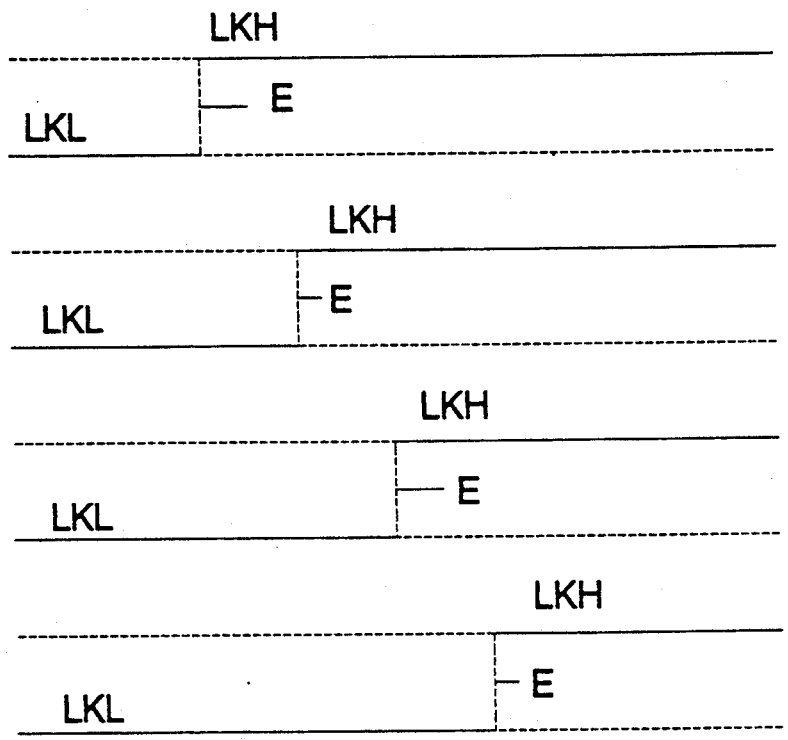
FIG. 4 diagrammatically illustrates a series of image representative signals having an edge between respective constant levels for successively offset edge-representative locations among fully sampled locations 0 and n.

FIG. 4 diagrammatically illustrates an iterative segmentation process applied to a sub-interval of fully sampled L signal values, with an edge E being inferred between respective high and low constant levels LKH and LKL, for successively offset edge-representative locations among fully sampled locations 0 and n. In accordance with this example of a one-dimensional segmentation process, it is presumed that the characteristics of the image conform to a prescribed model or template M, represented in the example illustrated in FIG. 4 by a step-wise variation in the L parameter between a relatively high, constant value LKH and a relatively low constant value LKL. In other words, within the sub-interval, an edge E is presumed between pixel locations 0 and n; on each side of the edge the value of L is a constant (either LKH or LKL). The values of the constants may be chosen by setting a given threshold based upon a priori knowledge of the image statistics and averaging the L values within the interval. As with the segmentation process itself, the particular mechanism through which the constants are defined is not critical to the invention.

For each iteration of the location of edge E, the sequence of L values $L_0, L_1, L_2, \ldots, L_n$ is compared with the model M and a measure of the fit of the model to the actual image-representative signals (for example, through a least squared error fit or choosing the center zero-crossing of $L - (L_0 + L_n)/2$) is derived. That segmentation model which produces the 'best fit' thereby 'tailors' the optimal location of the edge E and the mechanism through which the sub-sampled C values are interpolated within the sub-interval or region between pixel locations 0 and n.

The particular mechanism for interpolating an unknown value of C will depend on the characteristics of the bands of the L and C signals. Examples of the mechanism through which unknown values of C are defined include making each value of C within a region (on one side of the edge E) constant, making the difference C-L constant within the region, or making the ratio C/L constant within the region. For bands which are essentially decorrelated with one another, such as the in-phase and luminance channels in a YIQ system, the value of C is fixed within the region. For a red and green intensity imaging device, the ratio of red to green (green is fully sampled) is made constant within the region. For a log exposure imaging device, the difference between the red and green values is made constant within the region.

Figure 5:
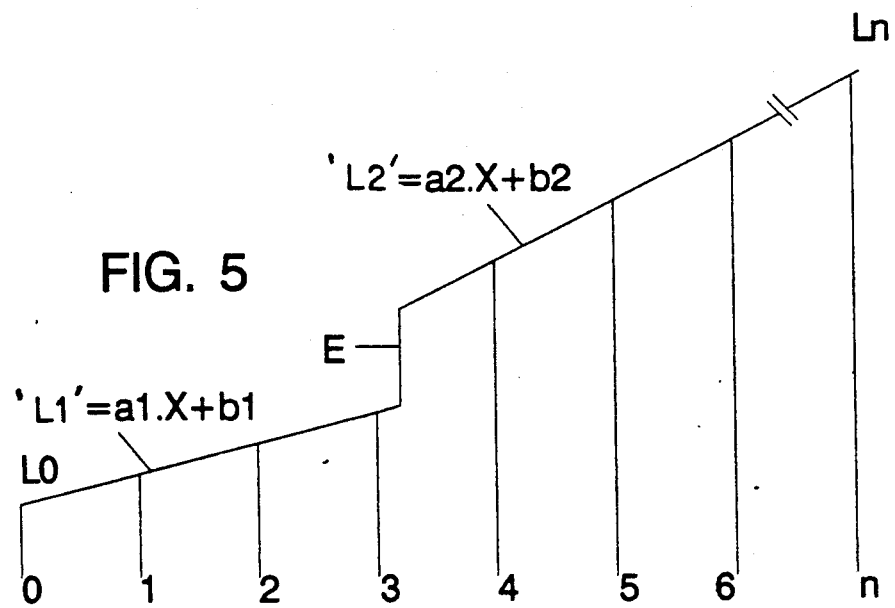
FIG. 5 diagrammatically illustrates an image representative signal having an edge between respective uniformly (linearly) varying regions containing fully sampled locations 0 and n.

FIG. 5 diagrammatically illustrates a second example of an iterative segmentation process that may be applied to a subinterval of fully sampled L signal values, with an edge E being inferred between respective uniformly values of L (of the form L = a.x + b) as represented by the line 'L1' = a1.x + b1 that extends between pixel location P0 and edge E, and the line 'L2' = a2.x + b2 that extends between edge E and pixel location Pn. In accordance with this example, the model M of the image characteristic has the form of a linear equation, represented in FIG. 5 by respective lines L1 and L2. As in the previous example, within the sub-interval, an edge E is presumed between pixel locations 0 and n, and on each side of the edge the value of L conforms with a respective relationship (here a linear variation rather than a constant, as in the previous example). The values of the coefficients a and b may be selected in accordance with image characteristics, including expected noise, and the magnitudes of each of C0, L0 and Cn, Ln at pixel locations 0 and n, respectively.

Again, as in the previous example, for each iteration of the location of edge E, the sequence of L values L0, L1, L2, ..., Ln is compared with the model M and a measure of the fit of the model to the actual image-representative signals is derived. That model which produces the best fit then establishes the location of the edge E and the mechanism through which the sub-sampled C values are interpolated within the sub-interval or region between pixel locations 0 and n. As noted previously, the mechanism for interpolating an unknown value of C will depend on the characteristics of the bands of the L and C signals and may include the relationships set forth above.

Figure 6A:
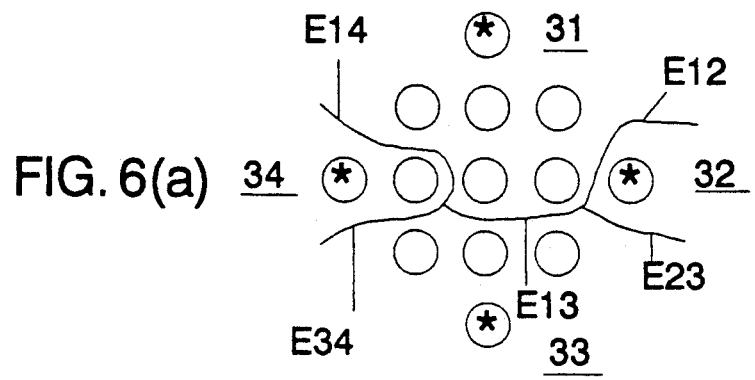
FIG. 6($a$)–6($b$) diagrammatically illustrate a portion of a two-dimensional pixel array and the two-dimensional segmenting of the pixel locations within the array such that each region contains a plurality of pixel locations whereat fully sampled signal values are provided and a pixel location whereat a sub-sampled signal value is provided.
Figure 6B:
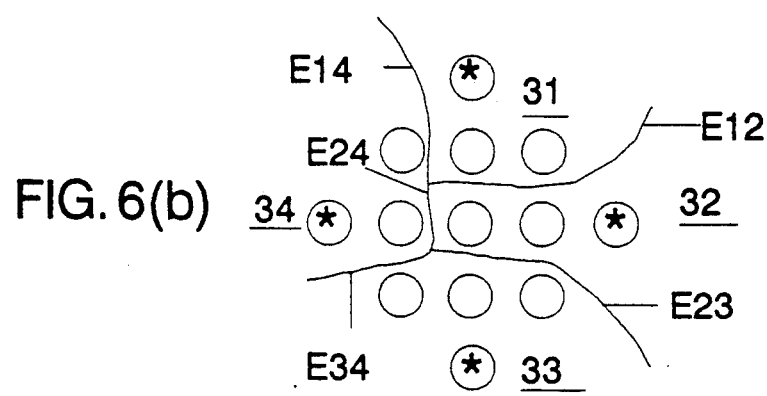
Figure 6C:
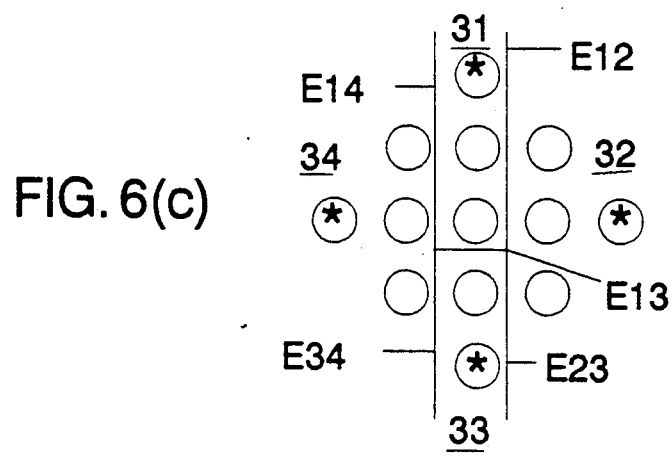

FIGS. 6(a)-6(c) show a portion of the region 27 of the pixel array of FIG. 2, which has been segmented into respective segmentation diagrams by a two-dimensional segmenting process, such that each portion of each diagram contains a plurality of pixel locations whereat fully sampled signal values are provided and one pixel location whereat a sub-sampled signal value is provided. More particularly, each of FIGS. 6(a)-6(c) illustrates a two-dimensional 'neighborhood' segmenting or subdividing of a two-dimensional array of pixels into four regions 31-34, each of which contains a pixel location P* (indicated by a circle only) at which both L and C values are supplied by camera 11 and some number of additional pixel locations Po at which only L values are provided and for which C values must be interpolated. An example of a 'neighborhood' segmenting process for the sampling geometry illustrated in FIG. 6(a)-(c) may be any of the types described in the published literature (e.g. "Handbook of Pattern Recognition and Image Processing" eds. T. Y. Young & K. S. Fu Academic Press 1986). Through iterative application of the segmenting process, groups of interconnected edge lines E between adjacent regions are produced, as shown in FIGS. 6(a)-(c). In the segmentation diagram shown in FIG. 6(a), for example, the geometry is subdivided by an edge line E12 between regions 31 and 32, edge line E13 between regions 31 and 33, edge line E14 between regions 31 and 34 and edge line E34 between regions 33 and 34. For each iteration of the placement of edge lines E, the L values within each region are compared with a (two-dimensional) model for the array (e.g a constant level or 'planar' model), and a measure of the fit of the model to the L values for each pixel location within a region is derived. As in the case of a one-dimensional segmentation process, that two-dimensional model which produces the best fit establishes the paths of the edge lines E and the mechanism through which the sub-sampled C values are interpolated within the region.

As described above, the interpolation method according to the present invention first segments image data pursuant to some prescribed one or two-dimensional segmentation procedure, and then, after performing a best fit tailoring the boundaries of the segmented regions, interpolates the sub-sampled C values at pixel locations for which C data was not originally supplied. As an enhancement of this process, rather than initially deciding upon a particular segmentation scheme and then applying the L data values to the chosen segmentation mechanism, the mechanism of the present invention may be carried out by applying a plurality of segmentation schemes to the data and assigning a figure of merit to each segmentation process. A typical measure of the figure of merit may again be based upon the mean square deviation of the actual L data from the chosen segmentation model. Another measure of the figure of merit that may be used is the likelihood that a segmentation could produce the given observed L data, based upon a statistical model of the image. Thus, for a plurality of segmentation schemes S1, S2, S3, ..., Sk, there is a corresponding plurality of performance or weighting coefficients W1, W2, W3, ..., Wk, each of which is associated with the figure of merit and a priori characteristics of the image. For example, the weighting function W may be established in accordance with the relationship:

$$W = \exp(-(\text{mean square deviation})/(\text{flat field variance}))$$

wherein the variance value provides a measure of the noise within a generally uniform region of the image.

For each segmentation diagram, all of the unknown C values are interpolated and then scaled in accordance with the weighting coefficient associated with the particular segmentation process employed. Finally, for each interpolated pixel location Pi, all of the values Ci for that location are summed over the total of the weighting coefficients to obtain a weighted average of the value of Ci.

As will be appreciated from the foregoing description, the problem of color fringing of edges between image regions of different color characteristics that are processed by conventional interpolation mechanisms is effectively obviated in accordance with the present invention by basing interpolation of sub-sampled image signals on an initial segmentation diagram, boundaries between which have been tailored to optimally subdivide the image data into a plurality of contiguous image regions of respectively different image characteristics. Because a boundary between adjacent regions occurs where the segmentation mechanism has tailored the inference of an edge, interpolated sub-sampled values in the neighborhood of that edge produce a reconstructed image that enjoys significantly improved quality over images produced by conventional linear interpolation.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of processing sampled signal values, produced by a color imaging device, representative of respectively different information contents of an input image, a first of said sampled signal values, associated with a first band containing information of first characteristics of said input image, being produced at a first spatial frequency, and a second of said sampled signal values, associated with a second band containing information of second characteristics of input image, being produced at a second spatial frequency, lower than said first spatial frequency, said method producing interpolated second signal values, for locations of said image between sampling locations at which second signal values are not produced, comprising the steps of:

(a) segmenting said input image into an image segmentation diagram formed of a plurality of regions of first signal values such that the first signal values in each respective region are associated with a common image characteristic for each respective region, while the image characteristics of adjacent regions differ from one another such that there is an image boundary between adjacent regions;

(b) for each of said plurality of regions, interpolating second signal values, for those locations within each respective region at which second signal sample values have not been produced, in accordance with a predetermined relationship between first and second signal values at a location in each respective region whereat each of first and second signal sample values have been produced.

2. A method according to claim 1, wherein step (a) comprises segmenting said input image into a plurality of segmentation diagrams in accordance with a prescribed image segmentation mechanism, each segmentation diagram be formed of a plurality of regions of first signal values such that the first signal values in each respective region are associated with a common image characteristic for each respective region, while the image characteristics of adjacent regions differ from one another, such that there is an image boundary between adjacent regions, and step (b) comprises, for each of the plurality of regions within a selected one of said plurality of segmentation diagrams, interpolating second signal values, for those locations within each respective region at which second signal sample values have not been produced, in accordance with a predetermined relationship between first and second signal values at a location in each respective region whereat each of first and second signal sample values have been produced.

3. A method according to claim 1, wherein step (a) comprises segmenting said input image into a plurality of segmentation diagrams in accordance with a plurality of respectively different image segmentation mechanisms, each segmentation diagram be formed of a plurality of regions of first signal values such that the first signal values in each respective region are associated with a common image characteristic for each respective region, while the image characteristics of adjacent regions differ from one another such that there is an image boundary between adjacent regions, and weighting each of said plurality of segmentation diagrams in accordance with a prescribed error characteristic between each segmented diagram and said input image, and step (b) comprises interpolating second signal values in accordance with the weighting of said plurality of segmentation diagrams.

4. A method according to claim 3, wherein step (b) comprises interpolating second signal values for each of said plurality of segmentation diagrams and obtaining a weighted average of respective interpolated second signal values produced from each of said segmentation diagrams.

5. A method according to claim 1, wherein step (a) comprises segmenting said input image into an image segmentation diagram formed of a plurality of regions of first signal values such that, within a respective region, each first signal value is the same, while the values of first signals for adjacent regions differ from one another, so that an image boundary is defined between adjacent regions.

6. A method according to claim 5, wherein step (a) comprises segmenting said input image into a plurality of segmentation diagrams in accordance with a plurality of respectively different image segmentation mechanisms, and weighting each of said plurality of segmentation diagrams in accordance with a prescribed error characteristic between each segmented diagram and said input image, and step (b) comprises interpolating second signal values in accordance with the weighting of said plurality of segmentation diagrams.

7. A method according to claim 6, wherein step (b) comprises interpolating second signal values for each of said plurality of segmentation diagrams and obtaining a weighted average of respective interpolated second signal values produced from each of said segmentation diagrams.

8. A method according to claim 1, wherein step (a) comprises the steps of:

(a1) inferring an image characteristic edge between successive sampling locations at which second signal values are produced by said color imaging device, (a2) processing first signal values produced at sampling locations that lie between said image characteristic edge and one of said successive sampling locations in accordance with a first image characteristic-defining relationship, and first signal values produced at sampling locations that lie between said image characteristic edge and another of said successive sampling locations, in accordance with a second image characteristic-defining relationship, so as to derive a measure of a prospective segmentation boundary between said successive sampling locations, (a3) repeating steps (a1) and (a2) for plural inferred image characteristic edges between said successive sampling locations, so as to obtain plural measures of prospective segmentation boundaries, and (a4) selecting, as an image boundary between adjacent regions of said segmentation diagram, that image characteristic edge which most closely fits a variation in said first signal values in accordance with said measures of prospective segmentation boundaries.

9. A method according to claim 8, wherein steps (a1)–(a4) are carried out with respect to a one-dimensional arrangement of sampling locations.

10. A method according to claim 8, wherein steps (a1)–(a4) are carried out with respect to a two-dimensional arrangement of sampling locations.

11. A method of processing sampled signal values, produced by a color imaging device, representative of respectively different information contents of an input image, a fully sampled channel of said signal values being associated with a first band containing information of first characteristics of said input image, and a sub-sampled channel of said sampled signal values being associated with a second band containing information of second characteristics of input image, said method producing interpolated second signal values, for locations of said image between sampling locations at which second signal values are not produced, comprising the steps of:

(a) segmenting the fully sampled channel into a segmentation diagram containing a plurality of contiguous image regions of respectively different image characteristics, such that, within a respective region, the fully sampled signal values are associated with a common image characteristic and, on either side of a boundary between adjacent regions, signal values for successive sampling locations of the fully sampled channel are assigned in accordance with different image characteristics; and (b) interpolating, within each region, signal values for non-sampled locations of said sub-sampled channel in accordance with a predetermined relationship between fully sampled and sub-sampled signal values at a sampling location in that region whereat each of fully sampled and sub-sampled signal values have been produced.

12. A method according to claim 11, wherein step (a) includes the step of segmenting the fully sampled channel into a plurality of different segmentation diagrams, the signal processing performance of each of which is defined by an associated weighting coefficient, and step (b) comprises interpolating signal values for non-sampled locations of said sub-sampled channel for each segmentation diagram and combining the interpolated signal values in accordance with said weighting coefficients.

* * * * *